United States Patent Office 3,442,794
Patented May 6, 1969

3,442,794
HYDROCARBON CONVERSION PROCESS WITH A CATALYST TREATED WITH AN ACID AND AN AMMONIUM COMPOUND
Henricus J. A. Van Helden, Herman W. Kouwenhoven, and Willem C. J. Quik, Amsterdam, Netherlands, assignors to Shell Oil Company, New York, N.Y., a corporation of Delaware
No Drawing. Filed Mar. 17, 1967, Ser. No. 623,831
Claims priority, application Netherlands, Mar. 25, 1966, 6603927
Int. Cl. C10g 13/04; B01j 11/00; C07c 3/42
U.S. Cl. 208—111
10 Claims

ABSTRACT OF THE DISCLOSURE

A process, catalyst and method of catalyst preparation for the conversion of hydrocarbons in the presence of hydrogen in which the catalyst contains one or more hydrogenation metallic or metallic compound components supported on a crystalline or cryptocrystalline silica-alumina in the acid or "H form," whose crystal lattice is acid resistant and which has been pre-treated, preferably separately, but in arbitrary order with an acid and an ammonium compound.

BACKGROUND OF THE INVENTION

Conversions of hydrocarbons in the presence of hydrogen are of significant commercial importance and well known in the art. Such conversion processes include for example hydrocracking, hydroisomerization of unsaturated aliphatic hydrocarbons, preparation of propanes and butanes and isomerization of saturated aliphatic hydrocarbons. In general, these conversion processes are carried out with heterogeneous catalysts consisting of hydrogenation components supported on refractory oxide supports.

For many of these conversions it has been found beneficial to employ a carrier material of crystalline aluminosilicate. Particular advantage has been found for those crystalline alumino-silicates in the acid or "H form."

Such carrier materials consist of crystalline or cryptocrystalline alumino-silicates that have been entirely or partially decationized, cations in the crystalline material having been replaced or exchanged for hydrogen ions. These materials so treated have become known as the acidic or "H form" of crystalline alumino-silicates. This catalytic form is achieved, in general, by pretreatment of cation-containing alumino-silicates with an acid or an ammonium compound. See, for example, U.S. 3,140,252 and U.S. 3,190,939.

SUMMARY OF THE INVENTION

Although the treatment of catalyst support materials as described above show excellent catalytic properties, further improvements are still attainable.

It has now been found that, surprisingly, a combination of the pretreatments, i.e., treatment with an acid and with an ammonium compound, which each separately would normally be considered to serve the same purpose and therefore, strictly speaking, be independent alternatives, result in better improvement than either of the pretreatments alone.

The present invention is therefore, in broad aspect, a process, catalyst and method of preparation of catalyst, for the conversion of hydrocarbons in the presence of hydrogen in which the catalyst contains one or more hydrogenation promoting metallic or metallic compound components supported on a crystalline or cryptocrystalline silica-alumina in the acid or "H form," the silica-alumina having a crystal lattice which is acid resistant and which has been pretreated, preferably separately, but in arbitrary order with an acid and an ammonium compound.

Crystalline alumino-silicates which are useful for the purposes of the invention are in general those which have a crystal lattice that is resistant to acid treatment. By "resistant" is meant in this context that by acid-treating, washing, drying and calcining the X-ray diffraction pattern (the crystalline form) of the carrier material is not substantially affected.

Examples of such materials are: mordenite, in particular the synthetic product, ptilolite and dachiardite. An example of a very suitable synthetic mordenite is the product marketed by Norton Company under the name of Zeolon.

For the acid treatment, both organic or inorganic acids may be used. It is preferred to use strong acids, that is, acids which at 25° C. have a dissociation constant of or greater than $2.0 \times 10^{-5}$. Examples of acids which are particularly suitable are strong mineral acids such as $H_3PO_4$, $H_2SO_4$, $HNO_3$ and $HCl$. Best results have been obtained with $HCl$. Of course, mixtures of acids may also be used.

As a rule dilute acids are used, preferably in aqueous solution. The concentration of the aqueous solution may vary over a wide range. Solutions of 0.1 to 10 N are desirable and in particular those which have a normality of 0.5–6 N. Solutions of 2 N concentrations are especially preferred.

Other substances which possess exchangeable hydrogen ions, such as carboxyl polyesters and ion-exchange resins may also be used as acids for the purposes of the invention.

The temperature and pressure for acid treatment may also vary over a broad range. It is preferred, however, that this treatment be effected at or near atmospheric pressure and at a temperature of at least 50° C. Temperatures of 150° C. can be used. Treatment at the boiling point of the acid-containing mixture is especially desirable.

Ammonium compounds for the catalyst treatment can be either organic or inorganic. By "ammonium compound" is meant any compound or mixture of compounds which can form ammonium ions.

The ammonium part of this compound preferably consists of $NH_4$, but may, if desired, be any mono-, di-, tri- or tetraalkyl alkenyl, aryl, aralkyl, ammonium group or a hydrazonium group.

Instead of ammonium compounds, nitrogen bases such as pyridine, guanidine, quinoline, etc., can also be used.

The anionic part of the ammonium compound can be fluoride, chloride, bromide, iodide, carbonate, bicarbonate, sulfate, phosphate, sulfide, thiocyanate, dithiocarbamate, peroxysulfate, acetate, hydroxide, benzoate, carbamate, sesquicarbonate, citrate, dithionate, gallate, nitrate, nitrite, formate, propionate, butyrate, valerate, lactate, malonate, oxalate, palmitate, tartrate and the like.

Preferably neutral, i.e., non-acidic ammonium compounds are used. In particular, moreover, preference is given to the simple inorganic ammonium compounds, notably $NH_4$ compounds, such as $NH_4OH$, $NH_4Cl$, $NH_4NO_3$, $NH_4$ sulfates, $NH_4$ phosphates, etc.

For convenience it is desirable to use a solution of the ammonium compound. Any ion-producing solution can be used including solutions of mixtures of ammonium compounds. The concentration of the ammonium compound solution can vary from 0.1 N to 40 N. Solutions of 0.1 to 20 N are more desirable and with a 2 N solution particularly good results have been obtained.

Treatment with the solution of ammonium compounds can vary over a temperature range of 0 to 100° C. A temperature range from 5 to 40° C. is preferred, with ambient temperautre being particularly suitable.

In some cases it is advantageous to repeat the acid treatment, the ammonium treatment or both once or several times.

It may also be desirable to apply after either of the kinds of pretreatment and preferably after both kinds of pretreatment a drying treatment, for instance, at a temperature between 100 and 150° C.

The drying treatment may be followed, or replaced, by calcining, which is often an advantage. Calcining can be effected at any suitable temperature, but is preferably effected at a temperature between 400 and 700° C., and in particular at a temperature between 450 and 550° C. At, for example, 500° C., excellent results have been obtained.

It is also possible, however, to remove the N radical from the catalyst carrier during the conversion reaction.

It has been found advantageous to repeat the treatment with the ammonium compound a sufficient number of times or for a sufficient period of time that the carrier no longer releases alkali metal, or at least, no longer releases alkali metal in quantities detectable by analytical means.

Although in principle any order of the pretreatments leads to an improved catalyst, it is preferred to effect the acid treatment prior to the treatment with the ammonium compound.

Using a catalyst prepared as described above, it is possible to effect hydrocarbon conversions in which better conversions are obtained than with catalyst supported on a catalyst not pretreated according to the invention.

Embodiments of the present invention which have proved highly advantageous are in isomerization processes, by which are understood processes for the conversion of hydrocarbons into more highly branched hydrocarbons. In particular, in isomerizations in the presence of hydrogen, the most striking results are obtained.

It has been found that, surprisingly, for isomerization, the conversion increases considerably as a consequence of the described pretreatment technique while a high selectivity is maintained (usually higher than 95%).

Hydrocarbons with at least four carbons in the molecule can be used as feed for isomerization. Hydrocarbons or hydrocarbon fractions boiling above 600° C. are not suitable. Preferred hydrocarbons for conversion are those which contain from four to ten carbon atoms in the molecule. When paraffin hydrocarbon fractions are used, unsaturated components in the feed are converted into isoperaffins. Olefins can also be used as feed to the process of the invention, in which case they are converted into isoparaffins. In analogous manner alkyl and alkenyl groups of alkyl and alkenyl aromatics, respectively, can be isomerized and, if desired, hydrogenated. In addition, it is possible to isomerize naphthenes by the process according to the invention.

Isomerization of hydrocarbons with from 4 to 10 carbon atoms per molecule is as a rule carried out at a reaction temperature between 150 and 300° C., preferably between 230 and 280° C. The pressure can vary within wide limits. Preferably a pressure between 3 and 50 kg./cm.$^2$ is used particularly from 10 to 40 kg./cm.$^2$; at 30 kg./cm.$^2$, very good results were obtained. The space velocity of the material to be converted is dependent on the reaction conditions and usually is between 0.5 and 10 kg., particularly between 1 and 5 kg. of starting material per kg. of catalyst per hour. The molar ratio of hydrogen to starting material can also vary within very wide limits between ½:1 to 10:1.

Paraffin waxes can also be isomerized as in a process for the preparation of lubricating oils.

Another important embodiment of the invention is for the preparation of propane and butanes by hydrocracking. Feed material can be hydrocarbons boiling below 350° C., such as gasolines and kerosenes. The reaction temperature is as a rule between 200 and 450° C., preferably between 350 and 400° C., if nickel mordenite, and preferably between 275 and 350° C. if platinum mordenite is used as catalyst.

The process can be carried out continuously, semi-continuously or batchwise.

The working pressure for hydrocracking is usually above 10 kg./cm.$^2$ Favorable results have been obtained at pressures between 20 and 100 kg./cm.$^2$. If desired, even higher pressures may be applied.

The space velocity of the material to be converted is dependent on the reaction conditions chosen and usually is between 0.1 and 10 kg., in particular between 0.5 and 2 kg. of starting material per kg. of catalyst per hour.

The ratio of hydrogen to hydrocarbon feed can vary over a range between 100 and 10,000 standard liters of hydrogen per liter of feed, preferably between 400 and 2,500 standard liters.

The process of the invention is suitable for hydrocracking in the broadest sense of the word. Not only the preparation, mentioned hereinbefore, of propane and butanes under stringent conditions, but also hydrocracking in a slight degree is possible; thus, for instance, the cloud point of a gas oil can be improved through hydrocracking. Suitable starting materials for this purpose are hydrocarbon oil fractions with a boiling range of from 150 to 500° C., in particular of from 150 to 350° C. The reaction temperature is as a rule between 200 and 450° C., preferably between 350 and 400° C. Usually a pressure above 20 kg./cm.$^2$ is chosen; for instance, between 75 and 125 kg./cm.$^2$ good results were obtained. The space velocity of the starting material is as a rule between 0.1 and 10 and preferably between 0.5 and 2 kg. catalyst per hour.

Hydrogen to oil ratios of from 100–10,000 standard liters of hydrogen per liter of feed can be used and in particular ratios from 400–2,500 standard liters per liter of feed are desirable.

The metallic or metallic compound which is incorporated into the catalyst base can be any metal or metal compound or mixture thereof, which have hydrogenation compound or activity. In particular, metals from Groups VIII, VI and I–B of the Periodic Table are useful and it is particularly preferred that the metal component be Pt, Pd, Ni or mixtures thereof.

The metals and/or metal compounds possessing hydrogenating properties are as a rule supported on the carrier after the acid and ammonium treatments have been effected. If desired, this can also be done prior to, or during these treatments.

The catalysts prepared according to the invention and, hence, supported on a carrier pretreated as described above, offer the advantage of being easy to regenerate. Although the present catalysts are outstanding because of their long catalyst life time, regeneration or reactivation can be effected very simply by burning off the catalyst at elevated temperature, if necessary with subsequent calcining. Carbon burning should be accomplished with a deficiency of oxygen in the regenerating gas stream at a temperature not higher than 550 to 600° C. After regeneration it is preferred to activate the catalyst with hydrogen before using it again in the process.

The following examples are included to illustrate the invention and are not intending to limit the scope thereof.

EXAMPLE I

Catalysts consisting of platinum supported on mordenite crystalline alumino-silicate were prepared by seven different methods.

The first method of preparation will be described in detail and, for the sake of brevity, other methods will be described by the way in which they differ from the detailed method.

In all methods the starting material was the sodium form of mordenite (marketed by Norton Company under the name of Zeolon). One kilogram of Zeolon was used for each method of catalyst preparation. The particle size of the starting material varied from 0.2 to 0.6 mm.

(1) In the first method the Na mordenite was boiled with 10 liters of 2 N HCl in a reflux condenser at atmospheric pressure for 1 hour.

The solid matter was filtered off and washed five times with 5 liters of ion-free water (pH 6–7), subsequently washed with a 1 N $NH_4NO_3$ solution until no Na ions could be detected in the wash liquor. The washed product was dried in air at 120° C. for 3 hours and then heated in air at 500° C. for 3 hours. Pt was incorporated on the H mordenite thus obtained by ion-exchange. After filtration, the catalyst was washed with 2½ liters of ion-free water, dried at 120° C. for 3 hours and finally calcined at 500° C. for 3 hours. The product contained 0.5% w. Pt.

(2) In the second method, the product, after the HCl treatment was dried (3 hours at 120° C.) and calcined (3 hours at 500° C.).

(3) In the third method, the HCl treatment was repeated, the product dried and calcined.

(4) In the fourth method, only the HCl treatment was repeated.

(5) In the fifth method, the Na mordenite was first treated with $NH_4NO_3$, dried and calcined, then treated with HCl twice and again dried and calcined (all under the conditions mentioned hereinbefore).

(6) In the sixth method, the $NH_4NO_3$ treatment was omitted.

(7) In the seventh method, no HCl treatment was used and the $NH_4NO_3$-treated Na mordenite was not dried or calcined.

The seven Pt-mordenite catalysts thus obtained (after activation with 2,000 standard liters of hydrogen per liter of catalyst for 1 hour) n-pentane was isomerized at 230° C., a pressure of pentane of 30 kg./cm.$^2$, and a hydrogen/pentane molar ratio of 2.5. Space velocity was 1 gm. pentane/hr./gm. catalyst. A second series of experiments was carried out, under otherwise equal conditions, at 250° C.

In the table below the various methods of catalyst preparation are summarized together with the results of the isomerization experiments.

TABLE I

| Method of treatment of carrier | Method of preparation of catalyst | | | | | | |
|---|---|---|---|---|---|---|---|
| | 1 | 2 | 3 | 4 | 5 | 6 | 7 |
| Acid | + | + | ++ | ++ | − | + | − |
| Drying/calcining | − | + | + | − | − | ++ | − |
| Ammonium salt | + | + | + | + | + | − | + |
| Dry/calcining | + | + | + | + | + | − | + |
| Acid | − | − | − | − | ++ | − | − |
| Drying/calcining | − | − | − | − | + | − | − |
| Isomerization temp., 230° C.: | | | | | | | |
| Pentane conversion | 32 | 32 | 44 | − | 28 | 12 | 15 |
| Iso/normal ratio in reaction product | 0.47 | 0.46 | 0.78 | − | 0.39 | 0.13 | 0.18 |
| Isomerization temp., 250° C.: | | | | | | | |
| Pentane conversion | 60 | 62 | 67 | 61 | 59 | 38 | 39 |
| Iso/normal ratio in reaction product | 1.5 | 1.6 | 2.0 | 1.6 | 1.4 | 0.6 | 0.6 |

+=Treatment; ++=Treatment repeated; −=Treatment not applied.

The above table clearly shows that isomerization of pentane in the presence of platinum on mordenite catalysts prepared according to the present invention (Nos. 1–5) gives considerably higher conversion than with catalysts prepared by known techniques (Nos. 6 and 7).

EXAMPLE II

For the production of propane and butanes, a Kuwait straight-run tops fraction boiling below 72° C., from which benzene and sulfur compounds had been removed, was passed over a platinum or mordenite catalyst prepared by method No. 1 of Example I. The conversion was effected at 320° C. and at a pressure of 30 kg./cm.$^2$. Space velocity was 1 gm. feed/hr./gm. catalyst. The hydrogen feed ratio was 2.5 (mole).

The table below shows the composition (percent w.) of the feed and reaction products formed after 1 and 10 hours of operation.

TABLE II

| | Feed | 1st Hour | 10th Hour |
|---|---|---|---|
| $C_1+C_2$ hydrocarbons | | 10.6 | 10.4 |
| Propane | | 45.0 | 47.5 |
| Isobutane | | 20 | 18.6 |
| n-Butane | 1.2 | 20.3 | 19.5 |
| Isopentane | 14.3 | 2.6 | 2.6 |
| n-Pentane | 24.5 | 1.5 | 1.4 |
| 2,2-dimethylbutane | 0.4 | | |
| 2,3-dimethylbutane | 3.4 | | |
| 2-methylpentane | 12.7 | | |
| 3-methylpentane | 10.3 | | |
| n-Hexane | 28.2 | | |
| Cyclohexane Methylcyclopentane | 5.0 | | |

EXAMPLE III

One kg. of Na mordenite was boiled with 10 liters of 1 N HCl under a reflux condenser for 3 hours. The solid matter was filtered off and washed five times with 5 liters of ion-free water (pH 6–7), subsequently treated with 1 N $NH_4NO_3$ solution until no more Na ions could be detected in the wash liquor. The product was dried at 120° C. for 3 hours. Subsequently the $NH_4$ ions of the $NH_4$ mordenite obtained were exchanged with nickel ions by percolation with 5.79 liters of a 0.5 molar nickel acetate solution. The product was washed with ion-free water until no more nickel ions could be detected in the wash liquor. Thereupon the product was dried at 120° C. for 3 hours and calcined at 500° C. for 3 hours.

The catalyst thus prepared was applied in hydrocracking a gas oil with a boiling range of 150–350° C. This gas oil was converted at a pressure of 100 kg./cm.$^2$ and a reaction temperature of 350° C. Space velocity was 1 liter gas oil/hr./liter catalyst. Hydrogen to gas oil ratio was 2,000 standard liters per liter. The cloud point of the 250–350° C. fraction of the feed was −9° C., that of the 250–350° C. fraction of the reaction product was below −33° C. The yield of gas oil (boiling range 250–350° C.) was 45.7% w., calculated basis total feed. The yield was 61% w., basis the 250–350° C. feed fraction.

The yield of gasoline (boiling range 15–80° C.) was 8.8% w. The iso/normal ratio of pentanes was 3.5.

EXAMPLE IV

A Kuwait straight-run naphtha (120–160° C.) was hydrocracked over a nickel mordenite catalyst prepared as described in Example III at a pressure of 75 kg./cm.$^2$, and a space velocity of 1 liter of naphtha per hour per liter of catalyst to produce propane and butanes and a light gasoline. The hydrogen/naphtha ratio was 2,000 standard liters per liter.

At a reaction temperature of 400° C. the reaction product contained 49.8% w. propane and butanes with a $C_3/C_4$ ratio of 1.77. The yield of gasoline was 44.2% w. The iso/normal ratio of the $C_5$ fraction was 4.5.

EXAMPLE V

One kg. of Na-mordenite was boiled with 10 liters of 1 N HCl under a reflux condenser for 3 hours. The solid matter was filtered off and washed five times with 5 liters of demineralized water (pH 6–7), subsequently treated with aqueous 1 N NH$_4$NO$_3$ solution until no more NA ions could be detected in the wash liquor. The product was dried at 120° C. for 3 hours. The product was impregnated with a 3.6% w. solution of ammonium molybdate in water and dried at 120° C. for 3 hours and calcined at 500° C. for 3 hours. The resulting product showed a molybdenum content of 4.0% w. This product was sulfided by increasing the temperature in 4 hours time from 20° C. to 375° C. in the presence of a gas mixture containing 87.5% volume of hydrogen and 12.5% volume of hydrogen sulfide, at a pressure of 10 atmospheres gauge. A temperature of 375° C. was maintained for 1 hour. The sulfided catalyst was used for the hydrocracking of a gas oil with a boiling range of 150°–350° C. under the conditions described in Example III.

The cloud point of the 250°–350° C. fraction of the reaction product was below −35° C. The yield of gas oil (boiling range 250°–350° C.) was 57.1% w. calculated on the total intake and 75.4% w. basis of the 250°–350° C. fraction of the feed.

The yield of gasoline (boiling range 15°–80° C.) was 3.8% w. (calculated on total feed). The iso/normal ratio of the C$_5$ fraction was 2.3.

EXAMPLE VI

A mixture consisting substantially of pentanes and hexanes was isomerized in the presence of hydrogen over a catalyst consisting of 0.5% w. platinum on synthetic mordenite pretreated according to the method of Example I, Experiment 3. The experiment was conducted for a considerable period without noticeable change in product composition or catalyst activity. Therefore, for convenience, the isomerization reaction was terminated and the catalyst artificially fouled with carbon deposits to simulate catalyst deactivation. Of course, under normal conditions, the catalyst rendered inactive by artificial means would have remained active for a very long period before requiring regeneration.

The artificially deactivated catalyst was regenerated by carbon burning at 400° C. using nitrogen which contained 0.5% w. oxygen. After burning the carbon, the catalyst was calcined in air at 500° C. for 1 hours and reduced with hydrogen at the same temperature according to the method of Example I.

After this regeneration the catalyst was placed in the reactor again and the isomerization reaction, with the same mixture of pentanes and hexanes, was resumed.

The results of the various isomerization experiments, all carried out at 260° C., a pressure of 30 atmospheres, a hydrogen/feed molar ratio of 2.5 and a WHSV of 1 are shown in the table below.

TABLE III

| Constituents | Feed | Fresh Catalyst | Deactivated Catalyst | Regenerated Catalyst |
|---|---|---|---|---|
| Hydrocarbons with less than 5 carbon atoms | 1.2 | 6.8 | 5.0 | 7.1 |
| Isopentane | 14.3 | 26.1 | 14.4 | 26.8 |
| n-Pentane | 24.5 | 12.1 | 22.6 | 13.3 |
| 2,2-dimethylbutane | 0.4 | 10.2 | 0.5 | 10.0 |
| 2,3-dimethylbutane | 3.1 | 4.9 | 3.5 | 4.7 |
| 2-methylpentane | 13 | 18.3 | 13.3 | 17.7 |
| 3-methylpentane | 10.3 | 10.6 | 10.3 | 10.2 |
| n-Hexane | 28.2 | 8.8 | 26.3 | 8.8 |
| Methylcyclopentane plus cyclohexane | 5.0 | 1.6 | 4.1 | 1.4 |

These experiments demonstrate the ease of regeneration of the catalyst to regain activity and selectivity practically identical to that of fresh catalysts.

We claim as our invention:

1. In a process for the conversion of hydrocarbons in the presence of hydrogen and catalyst containing a hydrogenation component supported on a solid support, the improvement which comprises carrying out the conversion reaction with a catalyst comprising: (a) a crystalline alumino-silicate having a crystal lattice resistant to acid treatment which (b) is pretreated, separately, with an acid and an ammonium compound and which (c) has incorporated therewith a hydrogenation component selected from the group consisting of a metal, metal compound and mixtures thereof, possessing hydrogenation activity.

2. The process of claim 1 wherein the alumino-silicate is mordenite.

3. The process of claim 1 wherein the pretreated alumino-silicate of step (b) is dried and calcined, the calcination being effected at a temperature of between 400–700° C.

4. The process of claim 1 wherein the treatment with acid precedes the treatment with the ammonium compound, the acid treatment being effected at a temperature of 50–150° C. with an acid having a concentration of 0.1 to 10 N and selected from the group consisting of HCl, HNO$_3$, P$_3$PO$_4$ and H$_2$SO$_4$ and the treatment with the ammonium compound being effected at a temperature of 0–100° C. with an aqueous solution of 0.1–20 N concentration.

5. The process of claim 2 wherein the hydrogenation component is selected from a metal of Groups VIII, VI and I–B of the Periodic Table of Elements and compounds thereof.

6. A method of preparing catalysts for the conversion of hydrocarbons in the presence of hydrogen which comprises separately treating a crystalline alumino-silicate having a crystal lattice resistant to acid treatment with an acid and an ammonium compound and incorporating with the treated alumino-silicate a hydrogenation component selected from a metal of Groups VII, VI and I–B of the Periodic Table of Elements and compounds thereof.

7. The method of claim 6 wherein the treated alumino-silicate is dried and calcined, the temperature of calcination being between 400–700° C.

8. The method of claim 6 wherein the acid treatment is effected at a temperature of 50–150° C. with an aqueous acid of 0.1–10 N concentration, the acid being selected from a group consisting of HCl, HNO$_3$, H$_3$PO$_4$ and H$_2$SO$_4$ and the treatment with ammonium compound being effected at a temperature of 0–100° C. with an aqueous solution of 0.1–20 N ammonium compound.

9. A catalyst composition consisting essentially of a crystalline alumino-silicate resistant to acid treatment which is separately treated with an acid and an ammonium compound and having incorporated therewith a hydrogenation component selected from Groups VIII, VI and I–B metal, compounds of said metals and mixtures thereof.

10. The process of claim 1 wherein the conversion of hydrocarbons is hydroisomerization of n-paraffins having from 5 to 7 carbon atoms per molecule.

References Cited

UNITED STATES PATENTS 3,239,471  3/1966  Chin et al. _____ 252—455
3,259,564  7/1966  Kimberlin _____ 208—111

PAUL M. COUGHLAN, Jr., *Primary Examiner.*

J. H. YOUNG, *Assistant Examiner.*

U.S. Cl. X.R.

252—455; 260—683.65